Aug. 18, 1931.   G. R. METCALF, JR.   1,819,654
CONNECTER
Filed Aug. 6, 1928

George R. Metcalf, Jr.
INVENTOR.

BY
ATTORNEYS.

Patented Aug. 18, 1931

1,819,654

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONNECTER

Application filed August 6, 1928. Serial No. 297,804.

This invention is designed to improve connecters and is particularly advantageous as a connecter for threadless conduits, and the invention is exemplified as a coupling for a threadless conduit. Features and details of the invention will appear from the specification and claims.

A preferred embodiment of the invention is illustrated in the accompanying drawings as follows:—

Figure 1:
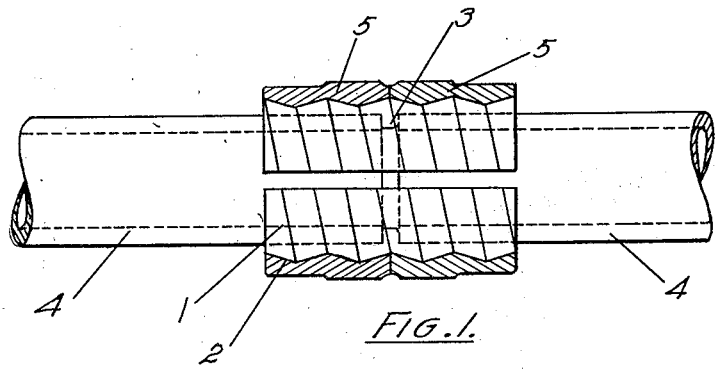
Figures 2, 3:
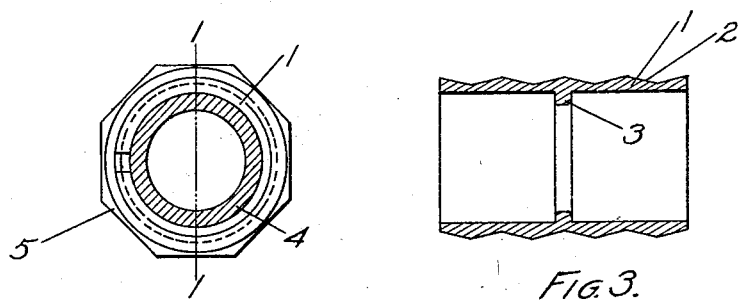

Fig. 1 shows a section on the line 1—1 in Fig. 2.

Fig. 2 an end view of the coupling.

Fig. 3 a section of the contractible tube of the coupling.

1 marks a contractible tube. This tube is provided with screw threads 2 throughout its length, these screw threads having slopes inclined in both directions, the inclination to the axis being preferably less than an inclination to a perpendicular to the axis. The tube has a longitudinal slot extending through it rendering it contractible. The tube is preferably provided with an annular rib 3 at its center forming a stop for inserted conduits 4. Sleeves 5 are screwed on to the tube, these sleeves being brought into engagement by rotation in opposite directions. As the sleeves are set up against each other the wedging surfaces of the threads contract the tube into clamping engagement with the inserted conduits.

What I claim as new is:—

1. In a connecter, the combination of a tube, said tube being axially slotted and having screw threads; and a screw-threaded member acting at each end of the tube on the screw threads of the tube with wedging engagement forcing the walls of the tube in a radial direction, said screw threaded members being in direct engagement at their inner ends.

2. In a connecter, the combination of a tube, said tube having an axial slot and having screw threads, said screw threads being similar and continuous throughout the length of the tube; and a screw-threaded member at each end of the tube acting on the screw threads with a wedging engagement forcing the walls of the tube in a radial direction.

3. In a connecter, the combination of a contractible tube slotted and exteriorly screw threaded, the screw threads being inclined in both directions, the inclination to the axis being less than to a perpendicular to the axis; and two opposing interiorly screw threaded sleeves on the slotted tube adapted by their wedging action on the screw threads of the tube to contract the tube.

4. In a connecter, the combination of a tube, said tube having an axial slot and screw threads, the screw threads being inclined, the inclination to the axis being less than to a perpendicular to the axis; and a screw-threaded member acting at each end of the tube on the screw threads with a wedging engagement forcing the walls of the tube in a radial direction.

5. In a connecter, the combination of a contractible tube slotted and exteriorly threaded, said threads being inclined, the inclination to the axis being less than the inclination to a perpendicular to the axis; and two opposing interiorly threaded sleeves on the slotted tube adapted by their wedging action on the screw threads of the tube to contract the tube.

6. In a connecter, the combination of a contractible tube slotted and exteriorly screw-threaded and having a central annular rib therein; and two opposing interiorly threaded sleeves on the slotted tube adapted by their wedging action on the screw thread of the tube to contract the tube.

In testimony whereof I have hereunto set my hand.

GEORGE R. METCALF, JR.